United States Patent
Gao et al.

(10) Patent No.: US 10,536,644 B2
(45) Date of Patent: *Jan. 14, 2020

(54) IMAGE CAPTURE COMPONENT

(71) Applicant: Oath Inc., New York, NY (US)

(72) Inventors: Shenglong Gao, San Francisco, CA (US); Adam Mathes, San Mateo, CA (US); Gregory Choi, Belmont, CA (US); Dongeun Lee, Santa Clara, CA (US); Luiz Fernando da Silva Pereira, Sunnyvale, CA (US); Yuhuan Tang, Santa Clara, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,585

(22) Filed: May 7, 2018

(65) Prior Publication Data

US 2018/0255246 A1 Sep. 6, 2018

Related U.S. Application Data

(63) Continuation of application No. 14/725,398, filed on May 29, 2015, now Pat. No. 9,967,467.

(51) Int. Cl.
| | |
|---|---|
| *H04N 5/232* | (2006.01) |
| *H04N 21/488* | (2011.01) |
| *H04N 21/4788* | (2011.01) |
| *H04N 21/4223* | (2011.01) |
| *H04N 21/414* | (2011.01) |

(Continued)

(52) U.S. Cl.
CPC ..... *H04N 5/23293* (2013.01); *H04N 21/2743* (2013.01); *H04N 21/41407* (2013.01); *H04N 21/4223* (2013.01); *H04N 21/4788* (2013.01); *H04N 21/488* (2013.01); *H04N 5/265* (2013.01)

(58) Field of Classification Search
CPC ............. H04N 5/23293; H04N 21/488; H04N 21/4788; H04N 21/4223; H04N 21/2743; H04N 21/41407; H04N 5/265
See application file for complete search history.

(56) References Cited

U.S. PATENT DOCUMENTS

| | | | | |
|---|---|---|---|---|
| 2010/0123735 A1* | 5/2010 | Blanchard | .......... | H04N 5/44591 345/620 |
| 2011/0173552 A1* | 7/2011 | Ikegami | .................... | G06F 8/38 715/765 |

(Continued)

*Primary Examiner* — Albert H Cutler
(74) *Attorney, Agent, or Firm* — Cooper Legal Group, LLC

(57) ABSTRACT

One or more systems and/or methods for capturing an image are provided. In an example, an application interface (e.g., a weather application interface), within which the image is to be populated, may be identified. The application interface may be evaluated to identify display context (e.g., a temperature label, weather visual effect, a weather icon, etc.) of the application interface. A camera user interface, associated with a camera of a device, may be displayed to a user. The display context may be overlaid a real-time image capture preview provided by the camera user interface so that the user may preview how the image may appear when used as a background image for the application interface (e.g., how a scene of a park may appear when the temperature label, weather icon, etc. are displayed over the background image). The image may be captured through the camera user interface utilizing the camera.

20 Claims, 11 Drawing Sheets

(51) Int. Cl.
*H04N 21/2743* (2011.01)
*H04N 5/265* (2006.01)

(56) References Cited

U.S. PATENT DOCUMENTS

| | | | |
|---|---|---|---|
| 2013/0083215 A1* | 4/2013 | Wisniewski | H04N 5/23222 348/222.1 |
| 2013/0262565 A1* | 10/2013 | Nakamura | H04L 67/42 709/203 |
| 2014/0304280 A1* | 10/2014 | Oursbourn | G06K 9/344 707/754 |
| 2015/0043824 A1* | 2/2015 | Akhavan Fomani | G06F 3/0237 382/188 |
| 2015/0074578 A1* | 3/2015 | Liang | G06F 3/0488 715/770 |
| 2015/0193141 A1* | 7/2015 | Goldsmith | G06F 3/04883 345/173 |
| 2015/0256875 A1* | 9/2015 | Park | H04N 21/42222 725/44 |

\* cited by examiner

IMAGE CAPTURE COMPONENT

RELATED APPLICATION

This application claims priority to and is a continuation of U.S. application Ser. No. 14/725,398, filed on May 29, 2015, entitled "IMAGE CAPTURE COMPONENT", which is incorporated herein.

BACKGROUND

Many users capture images for the purpose of providing the images to various application interfaces (e.g., weather application interfaces, dating application interfaces, sporting application interfaces, social media application interfaces, etc.). For example, a user may capture an image for incorporation into a social media application interface as a cover photograph. In another example, the user may capture the photograph for the purpose of using the image as a background image. However, incorporating images into application interfaces may present a significant challenge and/or burden for many users (e.g., alignment issues, sizing issues, occlusion from interface elements, etc.). In this regard, often a focal point of the image may be obstructed by display context (e.g., text, images, input boxes, other interface elements) within application interfaces. Thus, users may often capture multiple images and/or perform multiple edits on said images in order to obtain an image that may be properly configured to the application interface. Moreover, the user may need to insert the image into the application interface between each edit in order to evaluate how the edited image appears within the application interface. Unfortunately, many devices and/or computing environments may lack adequate image capture functionality.

SUMMARY

In accordance with the present disclosure, one or more systems and/or methods for capturing an image are provided. In an example, an application interface within which an image is to be populated may be identified. The application interface may be evaluated to identify display context of the application interface. In an example, the display context may comprise a text context, an image context, an advertisement context, or a visual effect context. In an example, the display context may comprise one or more user interface elements of the application interface (e.g., a text label, an icon, or other user interface elements that may overlay and/or occlude an underlying image). A camera user interface, associated with a camera of a device (e.g., a smartphone), may be displayed to a user. The display context may be overlaid over a real-time image capture preview (e.g., a viewfinder interface that displays real-time imagery viewed by the camera). In an example, the real-time image capture preview may be provided by the camera user interface. In an example of overlaying the display context, one or more user interface elements may overlaid the real-time image capture preview. The image may be captured through the camera user interface utilizing the camera. The image may be populated into the application interface. In an example, the image may be utilized as a background image for the application interface. In another example, the image may be utilized as a profile image and/or a cover photo image.

In an example, the image may be tagged with a digital identifier corresponding to at least one of the display context, the image, or the user. The image may be stored in an image repository. In an example, the image may be populated into an application interface by selecting the image from an image repository. The image may be selected from the image repository based upon the digital identifier corresponding to at least one of the display context and/or a user feature. In an example, the image may be provided to the application interface.

In an example, responsive to a focal point within the real-time image capture preview being obstructed by the display context, the real-time image capture preview may be adjusted such that the image focal point is not obstructed by the display context. In another example, at least one of a filter, a camera setting adjustment, or an image setting adjustment may be applied to the real-time image capture preview. The image may be generated based upon the real-time image capture preview and at least one of the filter, the camera setting adjustment, or the image setting adjustment.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
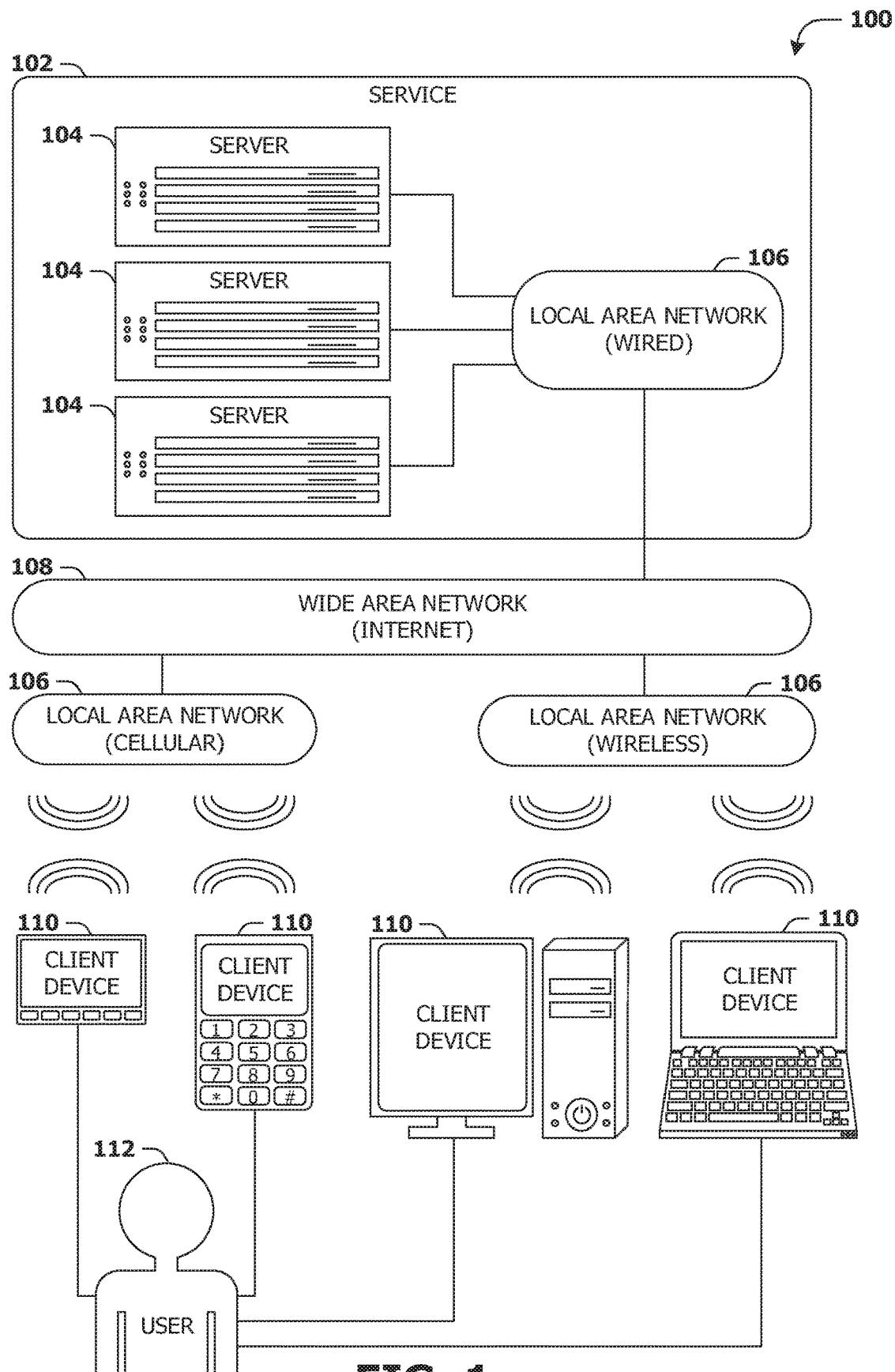
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
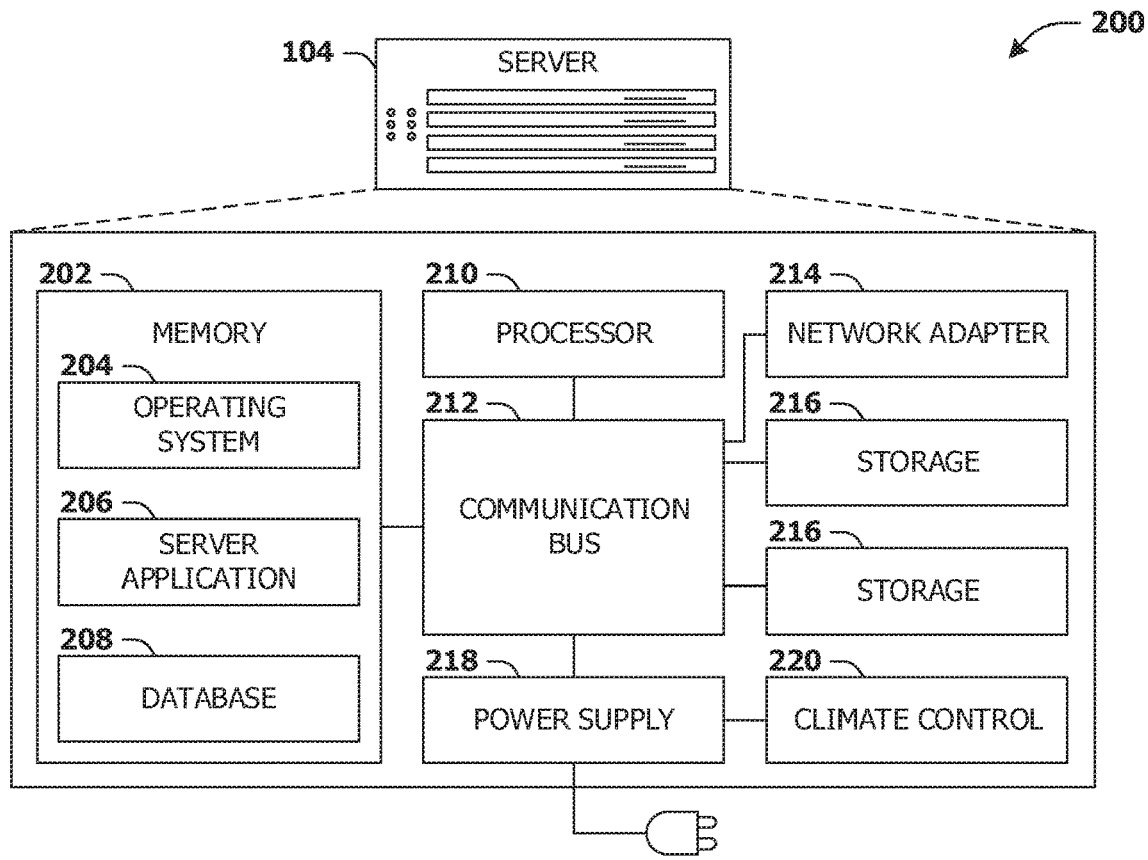
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
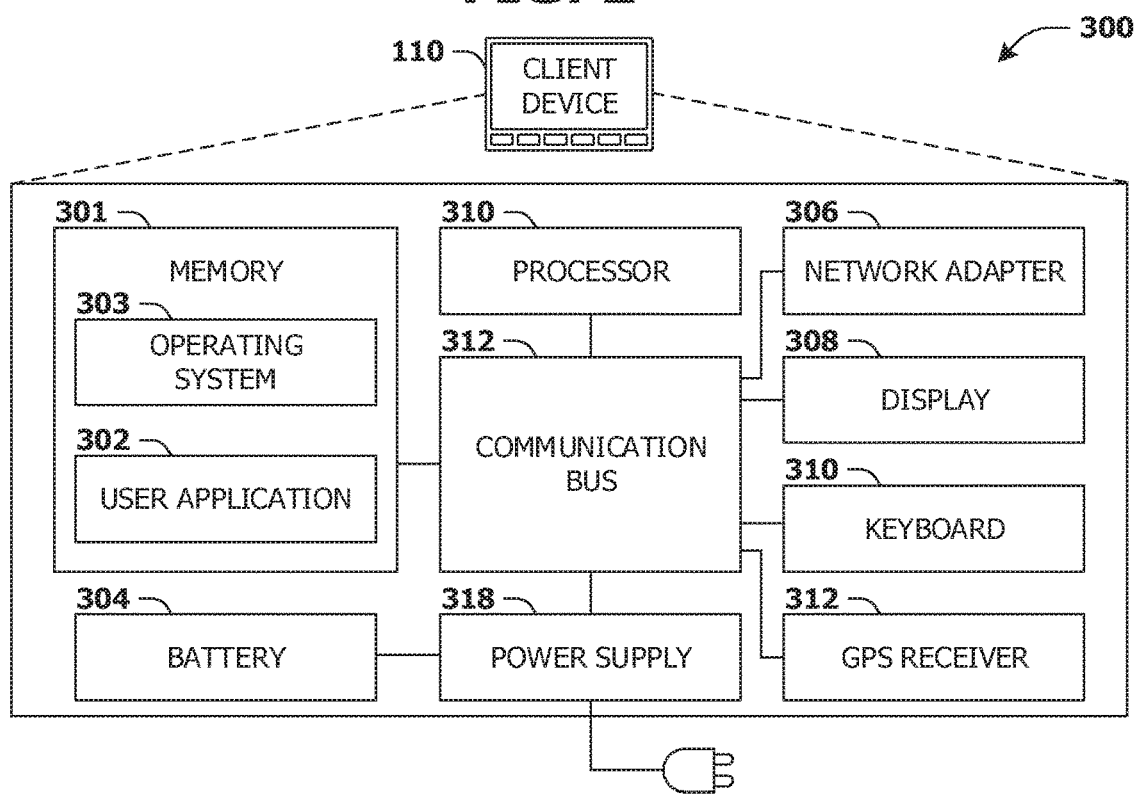
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for capturing an image are provided. Many users capture images for the purpose of providing the images to application interfaces (e.g., a background image for a weather application interface, a profile image for a dating application interface, a display image for a sporting application interface, etc.). However, incorporating images into application interfaces presents a significant challenge and/or burden for many users (e.g., a user may waste time and/or resources attempting to edit, modify, resize, and/or retake an image to be utilized by a particular application interface). Moreover, many devices and/or applications may lack preview techniques and/or functionality to determine how an image may look once the image is incorporated into the application interface (e.g., how the background image may appear within the weather application interface, such as how the background image may appear while temperature values, a sun icon, and/or other user interface elements of the weather application interface overlay the background image). As provided herein, an application interface may be identified within which an image is to be populated. The application interface may be evaluated to identify display context of the application interface. A camera user interface, associated with a camera of a device (e.g., smartphone, tablet, smartwatch, etc.), may be displayed to a user. The display context may overlaid a real-time image capture preview provided by the camera user interface. In an example, the real-time image capture preview may be adjusted such that a focal point (e.g., a main point of interest chosen by the user) within the real-time image capture preview may not be obstructed by the display context. The image may be captured through the camera user interface utilizing the camera. In an example, the image may correspond to the real-time image capture preview without the overlay of the display context or other modification (e.g., the image corresponds to what is viewed by the camera). The image may be populated into the application interface. In an example, the image may be utilized as a background image for the application interface.

In this way, display context for an application interface may be overlaid a real-time image capture preview to allow a user to preview/evaluate how the image may appear when populated into an application interface. Providing users with the ability to evaluate how images may appear within application interfaces so that adjustments may be made (e.g., by adjusting the real-time image capture preview, such as by zooming in/out, applying filters, changing image settings, panning a scene viewed by the camera, etc.) before images are captured may reduce the amount of time and/or computing resources spent capturing multiple images (e.g., users may capture multiple images in an attempt to generate an image that properly positions a focal point of an image, such that the focal point is not obstructed by user interface elements of the application interface) and/or editing images (e.g., the user may need to perform multiple edits to images in order to determine the best cropping and/or filters to apply to images based upon the display context). In this way, the user may not need to capture a plurality of images, waste time populating multiple images into application interfaces, and/or unnecessarily expend computing resources by storing and/or editing multiple images. Accordingly, efficiency, functionality, and/or overall user experience may be improved by the systems and/or techniques provided herein (e.g., a reduced need to capture a plurality of images; an increase in the efficiency of capturing images; a decrease in the likelihood of the user needing to edit images; etc.).

Figure 4:
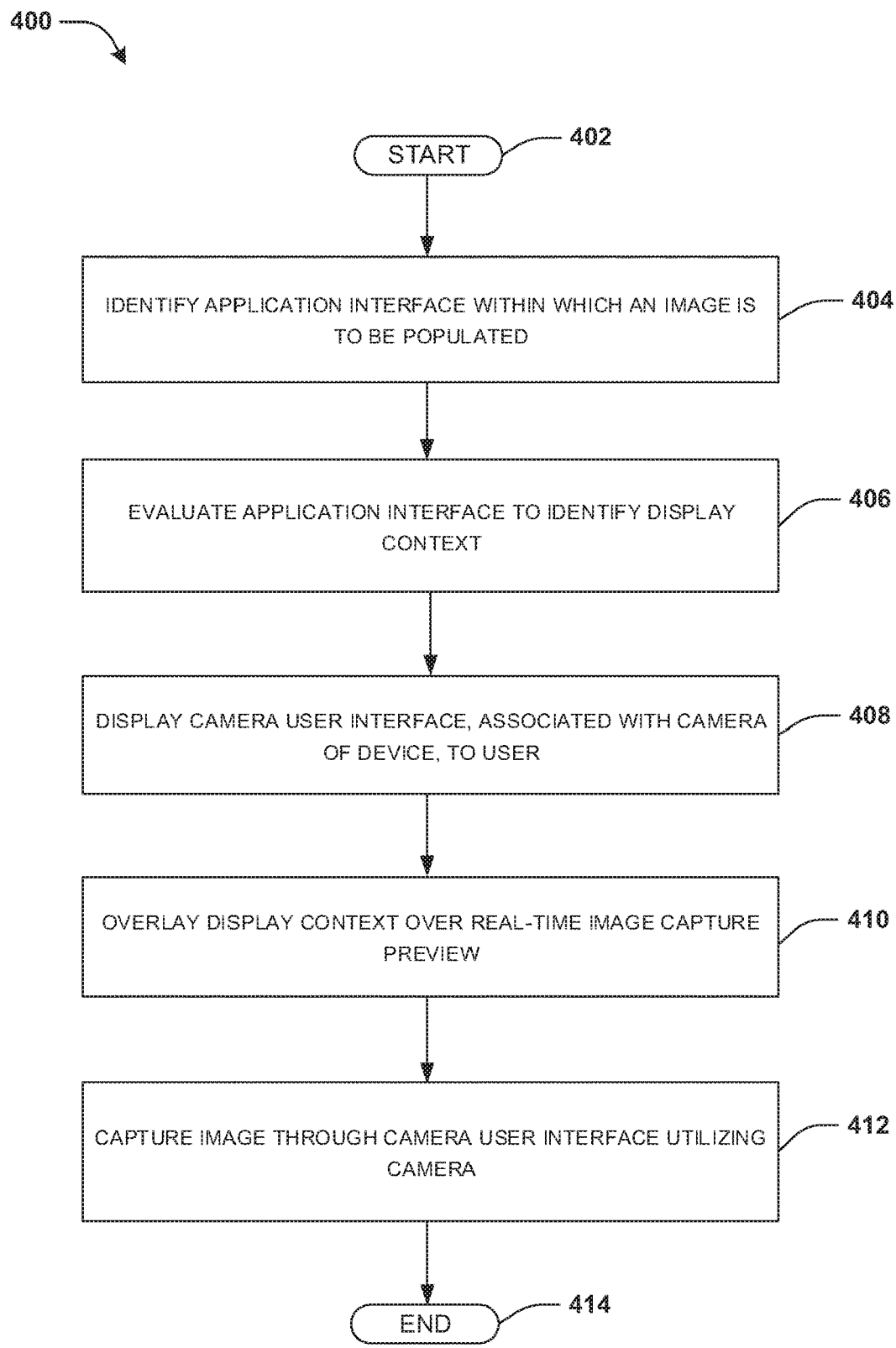
FIG. 4 is a flow chart illustrating an example method of capturing an image.

An embodiment of capturing an image is illustrated by an example method 400 of FIG. 4. At 402, the method 400 starts. At 404, an application interface (e.g., a weather application interface) may be identified. The application interface may correspond to an application, such as a weather application, a sporting application, a stock application, a newsfeed application, etc. In an example, the application interface may be capable of being populated with an image, such as a background image, a profile picture, etc. A device, such as a mobile device (e.g., a smartphone, a tablet, a smart watch, etc.), may display the application interface.

At 406, the application interface may be evaluated to identify display context of the application interface. The display context may comprise text context (e.g., a current time label, a date label, a location label, a temperature label, etc.), image context (e.g., pictures, icons, etc.), advertisement context (e.g., an advertisement bar for displaying an advertisement), interactive context (e.g., user interface elements, input boxes, news feed scrolls, etc.), and/or visual effect context (e.g., live action effects, animation effects, digital imagery effects, graphics interchange format effects, etc.). In an example, the text context may comprise text displayed by the application interface. In an example, the visual effect context may comprise a fading visual effect context, a magnifying visual effect context, an opacity visual effect context, a brightness visual effect context, a weather condition visual effect context (e.g., a rain visual effect context, a snow visual effect context, a hail visual effect context, a sleet visual effect context, a fog visual effect context, a lightning visual effect context, a tornado visual effect context, a hurricane visual effect context, a wind gust visual effect context, a cloud visual effect context, a sun condition visual effect context, a moon condition visual effect context, a tidal visual effect context, a wave visual effect context, a temperature visual effect context, a frost visual effect context, a humidity visual effect, a pressure front visual effect context, etc.), a road condition visual effect context (e.g., a slippery road visual effect context configured to display a car sliding on a wet road, etc.), a sporting visual effect context (e.g., a football visual effects context configured to display a football going through football goal posts in response to a field goal being kicked, etc.), etc. In an example, the interactive context may comprise one or more user interface elements displayed by the application interface. For example, a display camera user interface element may be displayed by the application interface (e.g., a camera icon configured to launch a camera application in response to being selected). In an example, a user selecting the display camera user interface element may trigger the evaluation of the application interface. The display context may be fixed (e.g., display context that does not change shape, position, etc., such as a static image of a cloud) or variable (e.g., display context that changes shape, position, color, etc., such as a cloud visual effect that moves across the application interface or a temperature label that may be populated with different temperatures).

At 408, a camera user interface, associated with a camera of the device, may be displayed to a user. In an example, the camera user interface may be displayed in response to the user selecting the display camera user interface element (e.g., selecting the display camera user interface element may cause the camera user interface to launch). The camera user interface may be utilized to direct the camera to generate the image.

At 410, the display context may be overlaid over a real-time image capture preview provided by the camera user interface (e.g., a live preview from the camera). The real-time image capture preview may be utilized as a viewfinder for the camera of the device (e.g., the real-time image capture preview may correspond to a scene viewed by the camera). In an example, the display context may remain fixed on the camera user interface and the real-time image capture preview may be adjusted based upon what is viewed by the camera (e.g., the viewable area of the camera may be adjusted, such as by zooming in, zooming out, changing position, panning, etc.). In this way, the user may view the real-time image capture preview relative to the display context for the application interface so that the user may evaluate, before the image is captured, how the image may appear when populated into the application interface.

In an example, responsive to determining that the display context is variable, dynamic display context may be defined for the display context. The dynamic display context may be utilized to provide various dynamic examples of how the display context may appear on the application interface (e.g., a temperature value may be automatically or manually rotated between values or a longest string of temperature digits may be displayed, a weather icon may be automatically or manually rotated between weather type icons, etc.) based upon various parameters corresponding to the display context (e.g., the dynamic display context may illustrate a first dynamic example of a clock display context having a first time parameter of 1:11; the dynamic display context may illustrate a second dynamic example of the clock display context having a second time parameter of 12:00; etc.). In an example, the dynamic display context may be configured to define a maximum area that the display context may encompass on the application interface (e.g., if a location display context is variable and permits up to 25 textual characters for describing a location, the dynamic display context may define an area corresponding to 25 textual characters). In another example, the user may define the dynamic context by setting a parameter for the dynamic display context (e.g., the user may set the time parameter for the clock display context to 1:10, 12:00, 8:59, etc.). The user may set the parameter by select the parameter from a dropdown box on the camera user interface, scrolling through parameters, or manually inputting a parameter (e.g., the user may select a thunderstorm image display context, a snowing image display context, etc.). In an example, the dynamic display context may be illustrated by overlaying at least one of a blacked out area, a boxed in area, an effect preview area (e.g., an area where a fading/opacity effect is applied), a variable text overlay area (e.g., an input box where the user may manual input various text labels), or other variable display context areas (e.g., a label 1:10, 3:20, 11:11, etc., a rain cloud weather icon, a snow storm weather icon, etc.). In this way, the dynamic display context may be utilized to provide dynamic examples of variable display context relative to the real-time image capture preview and/or the application interface.

In an example, filters (e.g., color filters, polarized filters, black and white filters, etc.) may be applied to the real-time image capture preview. In another example, camera setting adjustments (e.g., aperture settings, exposure time, etc.) and/or image setting adjustments (e.g., brightness, contrast, sharpness, etc.) may be applied to the real-time image capture preview. By applying filters, camera setting adjustments, and/or image setting adjustments to the real-time image capture preview with the display context overlaid, the user may evaluate the effect filters, camera setting adjustments, and/or image setting adjustments may have on the appearance of the a resulting image, the display context and/or the application interface (e.g., the user may determine that applying a black and white filter makes text context difficult to read such as a temperature label of the application interface, or that increasing a contrast setting improves the viewability of a visual effect context such as a snowfall effect of the application interface, etc.).

At 412, the image may be captured through the camera user interface utilizing the camera. The image may correspond to what is viewed by the camera, such that the image does not comprise the overlaid display context. In an example, the user may capture the image by selecting an image capture interface element displayed by the camera user interface. For example, responsive to evaluating the real-time image capture preview relative to the display context, the user may select the image capture interface element to generate the image. In an example, the image may be captured based upon the real-time image capture preview, the camera settings, the image settings, and/or any filters applied to the real-time image capture preview. In an example, the image may be generated from pixel data obtained by the camera, and the image settings adjustments and/or filter selection may be applied by the camera user interface.

In an example, capturing the image by utilizing the real-time image capture preview with the display context overlaid thereon may reduce and/or eliminate modifications, edits, and/or adjustments made to the image by the user after the image is captured (e.g., the image may not need to be cropped and/or scaled by the user in order for a focal point of the image to be displayed without being obstructed by the display context of the application interface). As such, users may spend less time editing images, and thus computing resource utilization for performing such edits may be reduced (e.g., less storage space may be utilized by generating less images; the user may spend less time trying to determine which image will work best as a background image without unwanted occlusion from user interface elements of the application interface; the user may spend less time adjusting image settings for the image in order to optimize the viewability of the image, etc.).

In an example, the image may be tagged with a digital identifier. The digital identifier may provide information relating to the image (e.g., subject matter of the image, when/where the image was captured, the camera settings used to capture the image, the application interface associated with the display context, etc.), the display context, and/or the user (e.g., copyright information, a user identification number, a user feature, etc.). For example, the digital identifier may provide a description of a person, place, thing (e.g., subject matter) within the image (e.g., a sunset, a cloudy day, a football stadium in Cleveland, etc.). In an example, the image may be tagged by the user, an application administrator, and/or a tagging component (e.g., the user may tag the image to identify that the image is of a skyscraper in Dallas; the tagging component may automatically tag the image based upon global positioning system (GPS) data, a description in a social media post, an identifier from image recognition technology, etc.).

The image may be populated into the application interface. In an example of populating the image into the application interface, the image may be provided from the camera user interface to the application user interface. Responsive to receiving the image, the image may be utilized by the application interface. For example, the image may be utilized by a social media application interface as a profile image and/or a cover photograph image. In another example, the image may be utilized by a weather application interface as a background image. In another example, the image may be stored in an image repository. The user may provide consent for other users to access and/or utilize the image within the image repository. The image repository may comprise a plurality of images tagged with digital identifiers (e.g., application interface digital identifiers identifying application interfaces comprising display contexts used to overlay real-time image capture previews used to capture such images). In another example of populating the image, the image repository may be accessed and the image may be selected from the image repository based upon the display context of the application interface. For example, a Cleveland skyline image may be selected from the image repository based upon display context of the application interface being a Cleveland location display context (e.g., the weather application may display the Cleveland location display context while displaying Cleveland weather). In another example, responsive to the location display context changing to a Pittsburgh location display context (e.g., as a result of the user traveling to Pittsburgh, searching for weather conditions in Pittsburgh, looking up sports scores for a Pittsburgh baseball team, etc.), a Pittsburgh skyline image may be selected from the image repository. In another example, the image may be selected based upon the image identifier corresponding to the display context. For example, responsive to the display context being a cloudy visual effect context, an image tagged with a cloudy day image identifier may be selected from the image repository.

In an example, a user feature may be identified for the user. The user feature may be based upon a user characteristic (e.g., age of the user, location of the user, etc.), a user preference (e.g., favorite sport team, favorite website, favorite activity, favorite type of photography, etc.), and/or a past activity of the user with the application interface (e.g., the user indicating an interest in a background image, the user indicating a disinterest in another background image, the user primarily capturing black and white images for use as background images, etc.). In an example, the image may be selected from the image repository based upon the user feature. For example, the image may be selected in response to the user feature corresponding to the digital identifier for the image. Responsive to the user feature corresponding to the digital identifier, the image may be provided to the application interface, such as for display as a background image, cover photograph, etc., for the application interface.

By providing users with images based upon display context of application interfaces and/or user features, an overall user experience may be improved and/or the user may be more likely to be engage by the application interface. At 414, the method 400 ends.

Figure 5A:
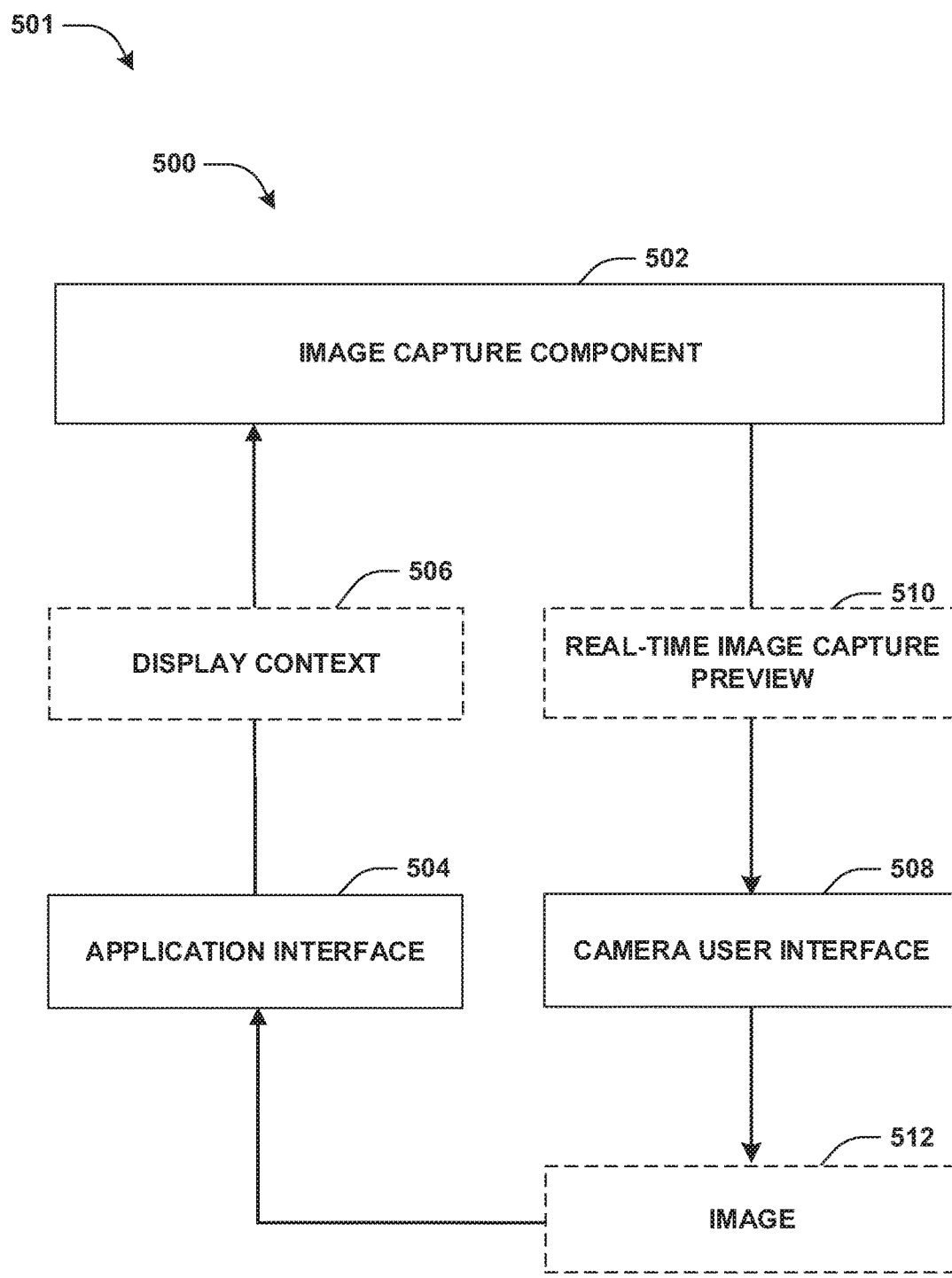
FIG. 5A is a component block diagram illustrating an example system for capturing an image, where the image is provided to an application interface.
Figure 5B:
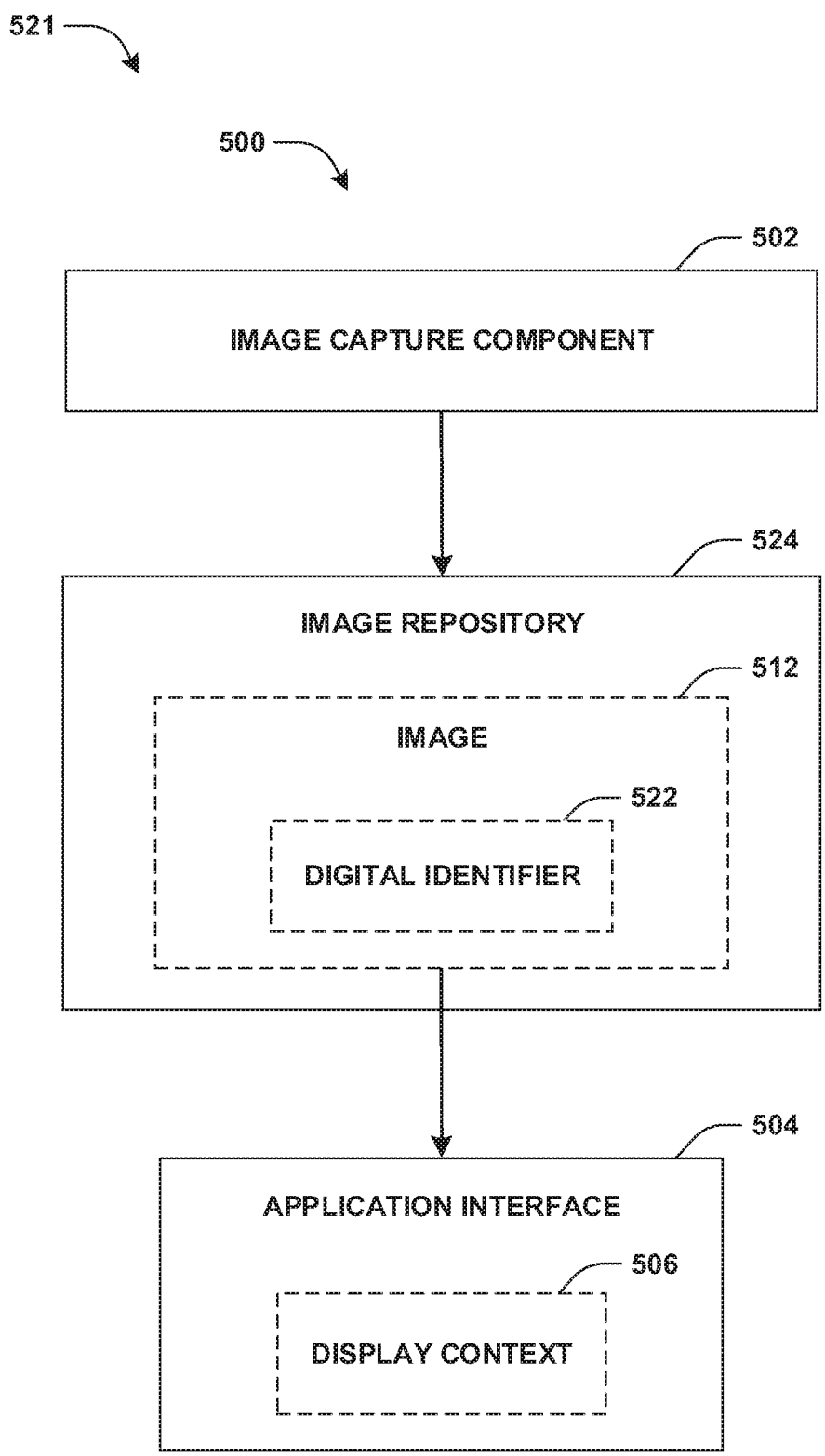
FIG. 5B is an illustration of an example system for capturing an image, where the image is stored in an image repository and provided to an application interface therefrom.

FIGS. 5A-5B illustrate examples of a system 500 for capturing an image 512. The system 500 may comprise an image capture component 502. FIG. 5A illustrates an example 501 of the system 500, where the image capture component 502 identifies an application interface 504, such as a weather application interface, within which an image 512 is to be populated. The image capture component 502 may be configured to evaluate the application interface 504 to identify display context 506 of the application interface 504 (e.g., a weather icon user interface element, a location label, a temperature label, a weather effect such as a snow or rain effect, etc.). In an example, the image capture component 502 may evaluate the application interface 504 to identify display context 506 by performing text recognition analysis (e.g., optical character recognition analysis, intelligent character recognition analysis, optical mark recognition analysis, etc.), image recognition analysis, and/or code recognition analysis (e.g., application code may be evaluated to determine size, location, or function of user interface elements).

Responsive to identifying the display context 506, the image capture component 502 may be configured to display a camera user interface 508 to a user. The camera user interface 508 may be associated with a camera (not illustrated). In an example, the camera user interface 508 may be configured to control the camera of a mobile device. The image capture component 502 may be configured to overlay the display context 506 over a real-time image capture preview 510 provided through the camera user interface 508. In an example, the real-time image capture preview 510 may be adjusted based upon the display context 506. For example, the user may adjust (e.g., zoom in, zoom out, crop, change the position of the camera, etc.) the real-time image capture preview 510 to change a focal point within the real-time image capture preview so that the focal point is less obstructed by the display context 506 (e.g., the real-time image capture preview may be adjusted such that merely 30% of the focal point is obstructed as opposed to 50% of the focal point being obstructed originally). The image capture component 502 may be configured to capture the image 512 by utilizing the camera, where the image 512 does not comprise the display context. The image capture component 502 may be configured to populate the image 512 into the application interface 504. For example, image 512 may be utilized as a background image for the weather application interface (e.g., an image of a city corresponding to the location label).

FIG. 5B illustrates an example 521 of the image 512 being provided to an application interface 504 from an image repository 524. The image capture component 502 may be configured to tag the image 512 with a digital identifier 522. In an example, the digital identifier 522 may correspond to the display context 506 utilized during the generation of the image 512 (e.g., an indication that the image of the city was captured while a weather application interface of the weather application, such as the weather icon user interface element, the temperature label, the weather effect, etc., was overlaid the real-time image capture preview 510) and/or a characteristic of the image 512 (e.g., the digital identifier 522 may provide a description of the subject matter of the image, GPS data corresponding to a location where the image was captured, a time stamp corresponding to when the image was captured, a user identifier corresponding to the user that generated the image, etc.). The image capture component 502 may be configured to store the image 512 within the image repository 524. In an example, storing the image 512 may comprise cataloging the image 512 within the image repository 524 based upon the digital identifier 522.

The image capture component 502 may be configured to populate the image 512 into the application interface 504. In an example, the image capture component 502 may be configured to access the image repository 524. The image 512 may be identified from the image repository 524 based upon the digital identifier 522 corresponding to the display context 506 of the application interface 504 into which the image 512 is to be populated. The image capture component 502 may be configured to provide the image 512 to the application interface 504.

Figure 5C:
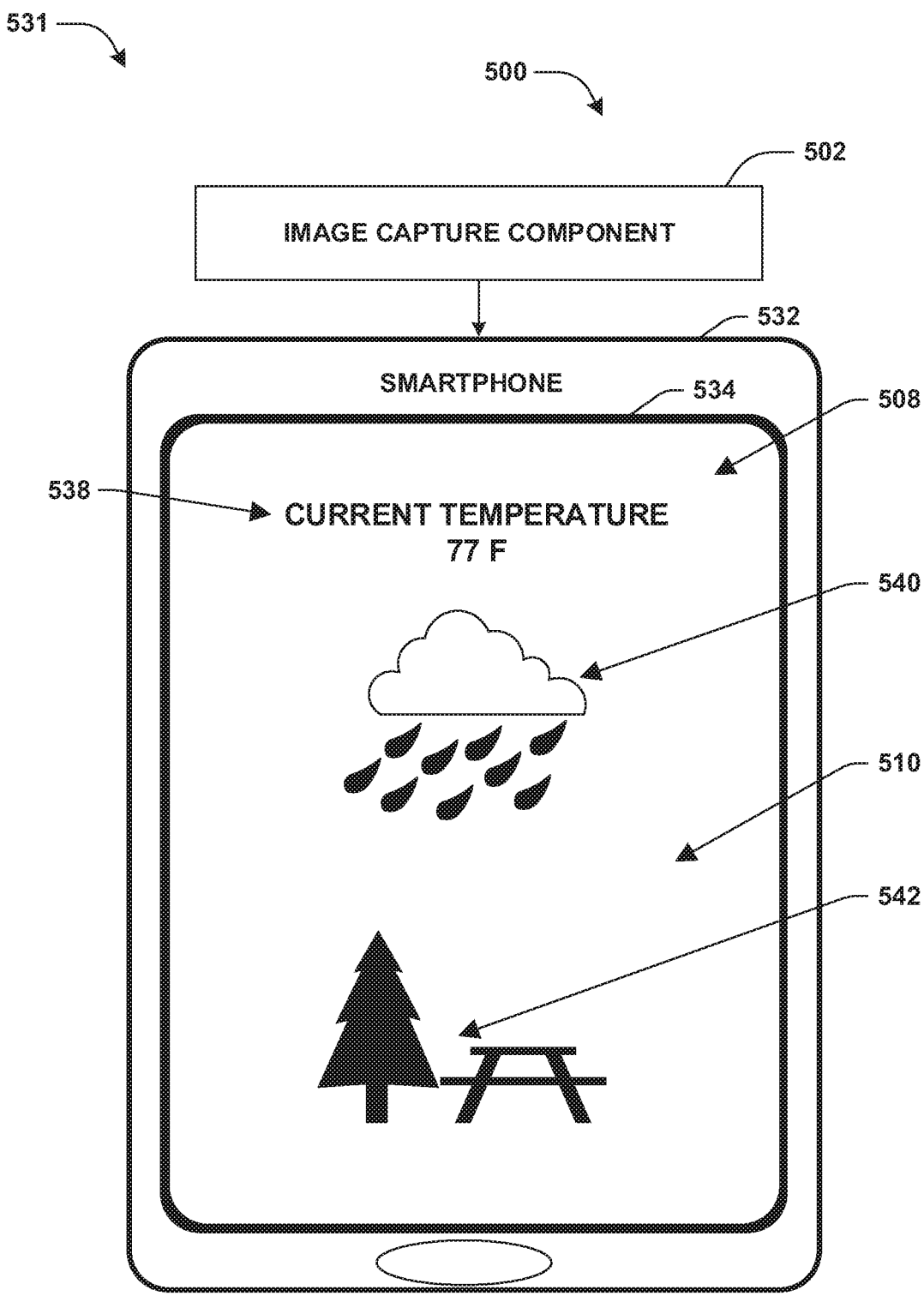
FIG. 5C is an illustration of an example system for capturing an image, where a display context is overlay a real-time image capture preview.

FIG. 5C illustrates an example 531 of the image capture component 502 overlaying a temperature display context 538 and a rain visual effect context 540 over the real-time image capture preview 510 provided by the camera user interface 508. In an example, the camera user interface 508 may be displayed on a display 534 of a smartphone 532. In an example, the real-time image capture preview 510 may be adjusted such that a focal point 542 within the real-time image capture preview 510 is less obstructed by the temperature display context 538 and/or the rain visual effect context 540 (e.g., a park scene, depicted by the real-time image capture preview 510 based upon the camera viewing the park scene, may be panned down so that the focal point 542 of the park scene is not visually occluded by the temperature display context 538 and/or the rain visual effect context 540). In this way, by viewing the real-time image capture preview 510 with the temperature display context 538 and the rain visual effect context 540 overlaid thereon, the user may preview how the image 512 would appear when populated into the application interface 504, such as the weather application interface on a rainy day with a temperature of 77 degrees.

Figure 6A:
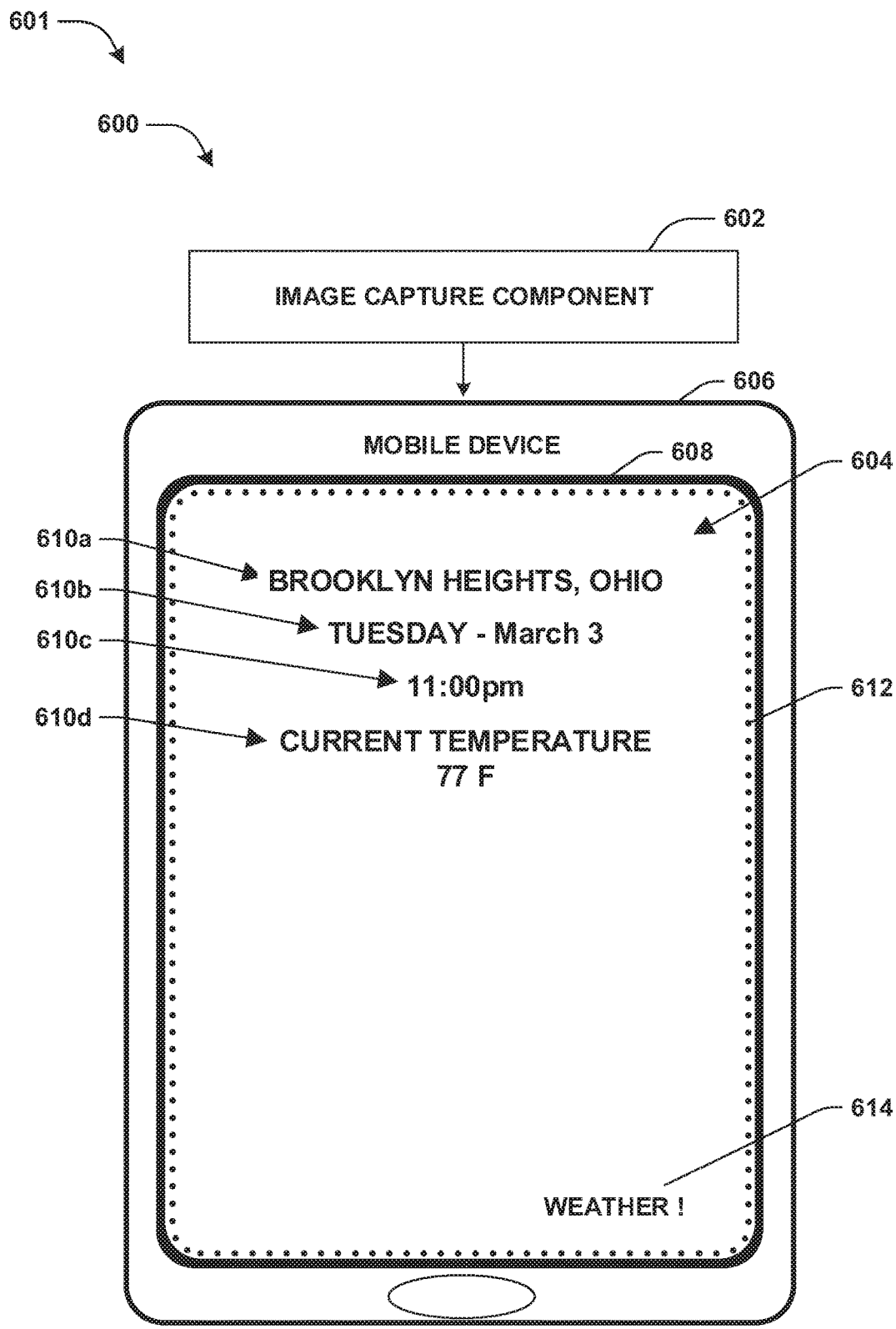
FIG. 6A is an illustration of an example system for capturing an image on a mobile device, where an application interface is evaluated.
Figure 6B:
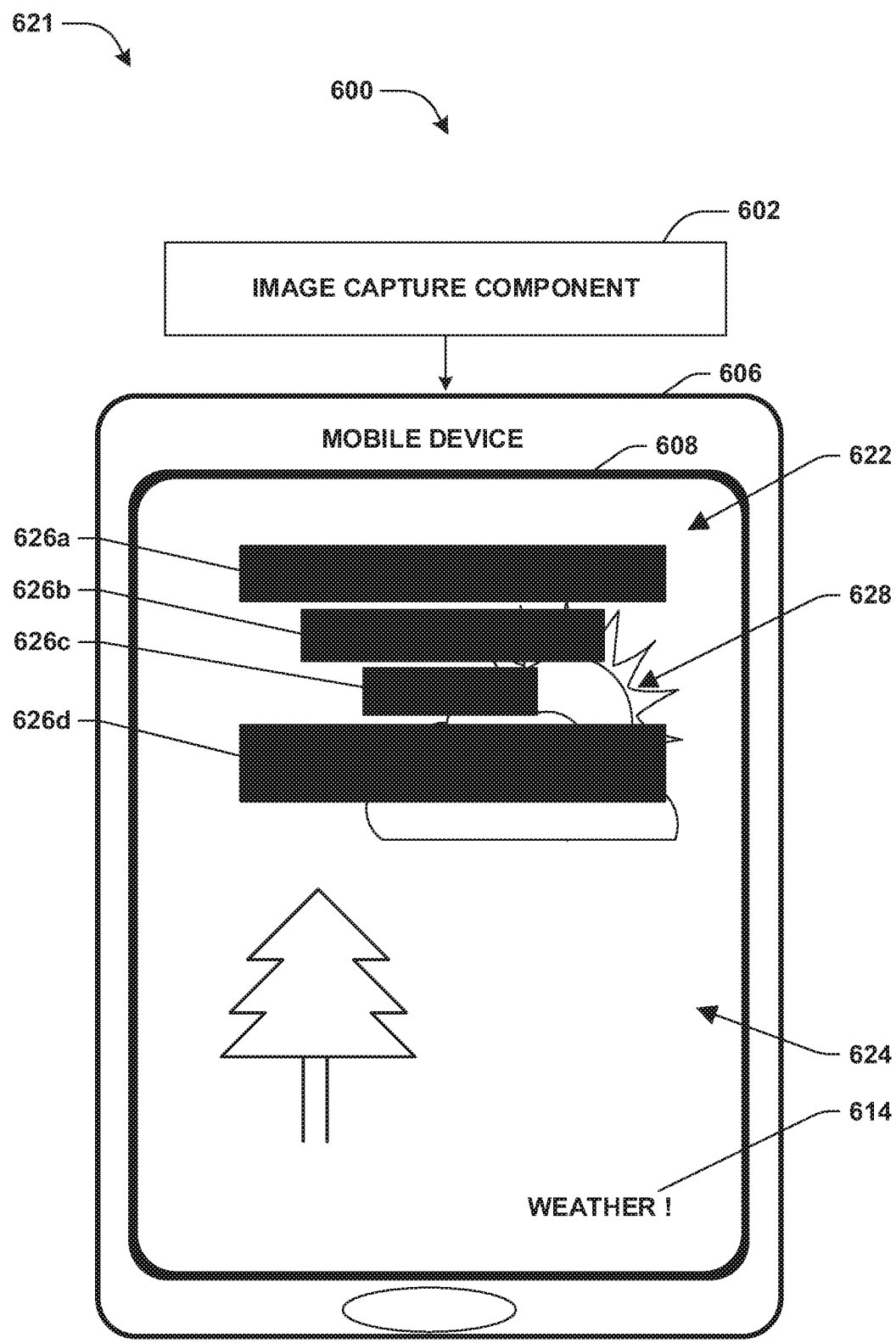
FIG. 6B is an illustration of an example system for capturing an image on a mobile device, where display context is overlay over a real-time image capture preview.
Figure 6C:
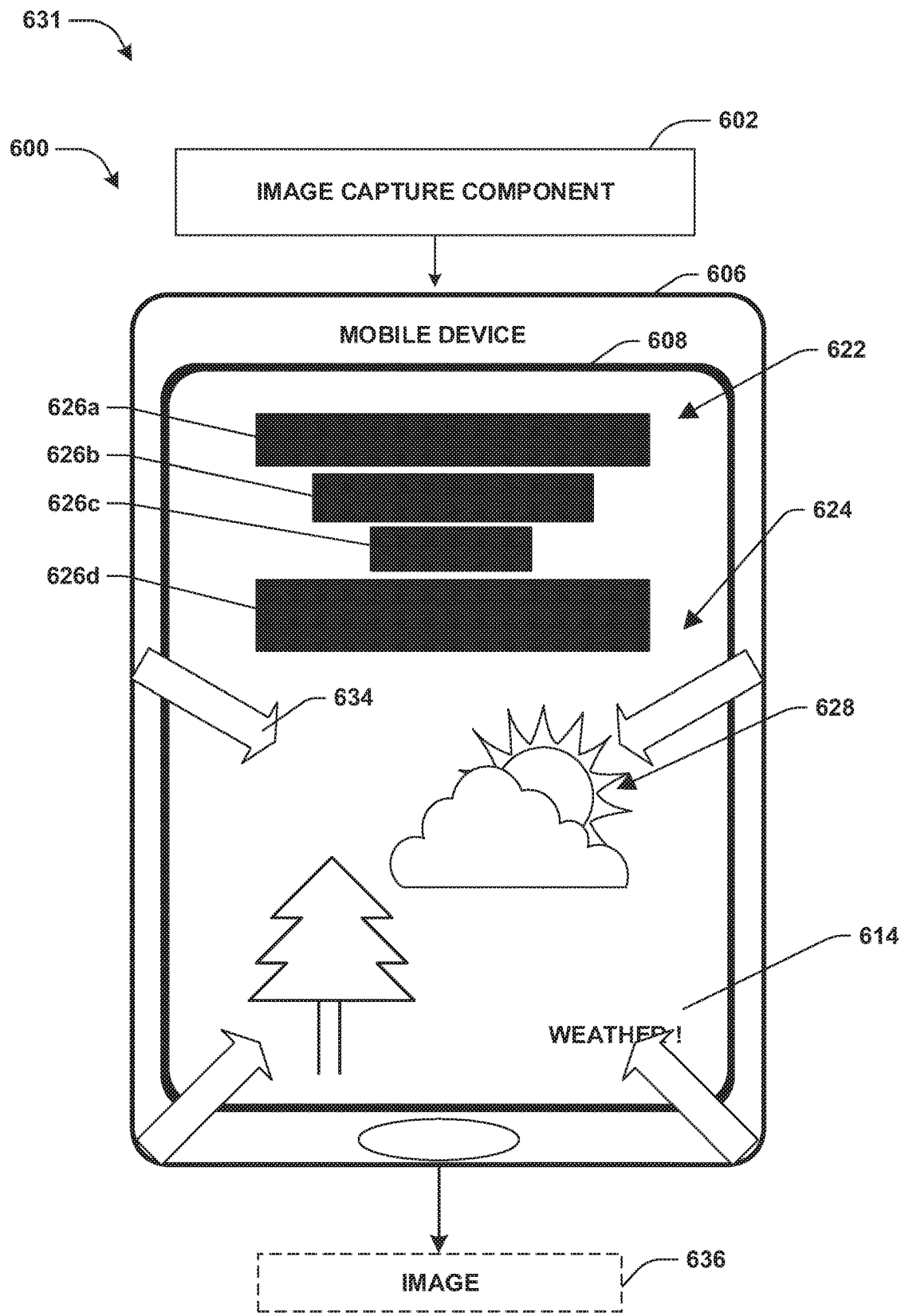
FIG. 6C is an illustration of an example system for capturing an image on a mobile device, where a real-time image capture preview is adjusted.

FIGS. 6A-6C illustrate examples of system 600 for capturing an image. The system 600 may comprise an image capture component 602. FIG. 6A illustrates an example 601 where a weather application interface 604 may be identified on a display 608 of a mobile device 606. The weather application interface 604 may comprise a background area 612 (e.g., an area that may be populated with images by a user). In an example, the image capture component 602 may identify a location display context 610a, a date display context 610b, a time display context 610c, a temperature display context 610d, and/or a logo user interface element 614 within the weather application interface 604. The display context 610a-610d may be determined to be variable and the logo user interface element 614 may be determined to be fixed.

FIG. 6B illustrates an example 621 where a camera user interface 622 is displayed on the display 608. In an example, the camera user interface 622 may be displayed in response to a user selecting a display camera user interface element 614 (not illustrated). The camera user interface 622 may provide a real-time image capture preview 624 corresponding to a scene (e.g., a sunny day, a cloud, a tree, etc.) within a viewable area of the camera. In an example, responsive to determining that display contexts 610a-610d are variable, dynamic display context 626a-626d may be defined for display context 610a-610d. The dynamic display context 626a-626d may be overlaid over the real-time image capture preview 624. In an example, the dynamic display context 626a-626d may comprise blacked out areas corresponding to a maximum area for the display context 610a-610d. It may be appreciated that while the dynamic display context 626a-626d are illustrated as blacked out areas, that other dynamic display contexts are contemplated herein, such as a textual and/or visual display of the display context 610a-610d (e.g., textual labels, such as "Brooklyn Heights, OHIO", "Tuesday—March 3", "11:00 pm", etc. that may be overlaid the real-time image capture preview 624) that may be populated with generic information (e.g., a generic location, time, temperature, dates, etc.) and/or may be manually changed by a user (e.g., the user may specify and/or select a date, temperature, time, and/or other information to display through the dynamic display context 626a-626d). In another example, responsive to determining that the logo user interface element 614 is a fixed, the logo user interface element 614 may be overlaid on the real-time image capture preview 624 (e.g., the logo user interface element 614 may be overlaid on the real-time image capture preview 624 as it appears on the weather application interface 604). In this way, the real-time image capture preview 624 may be utilized to provide the user with an example of what the image may look like when populated into the application interface 608. In an example, the real-time image capture preview may be evaluated to determine that a focal point object 628 (e.g., the sun and cloud) is partially obstructed by the dynamic display context 626a-626d.

FIG. 6C illustrates an example 631 where the real-time image capture preview 624 is adjusted. The real-time image capture preview 624 may be adjusted so that the focal point object 628 is moved to a display location that is less visually occluded/obstructed by the dynamic display context 626a-626d (e.g., the scene, depicted by the real-time image capture preview 624 and viewed by the camera, may be panned downward so that the sun and cloud are not visually obstructed by the dynamic display context 626a-626d). In an example, the image capture component 602 may be configured to perform a zoom function 634 to adjust the size of the focal point object 628 such that the focal point object 628 may not be obstructed by the dynamic display context 626a-626d. Responsive to the user being satisfied with the real-time image capture preview 624 relative to the dynamic display context 626a-626d and/or the logo user interface element 614, the user may utilize the camera user interface 622 to capture the image 636, where the image does not comprise the dynamic display context 626a-626d and/or the logo user interface element 614. In this way, the user may efficiently and effectively capture the image 636, which may be populated into the application interface 604 as a background image for the weather application interface.

Figure 7:
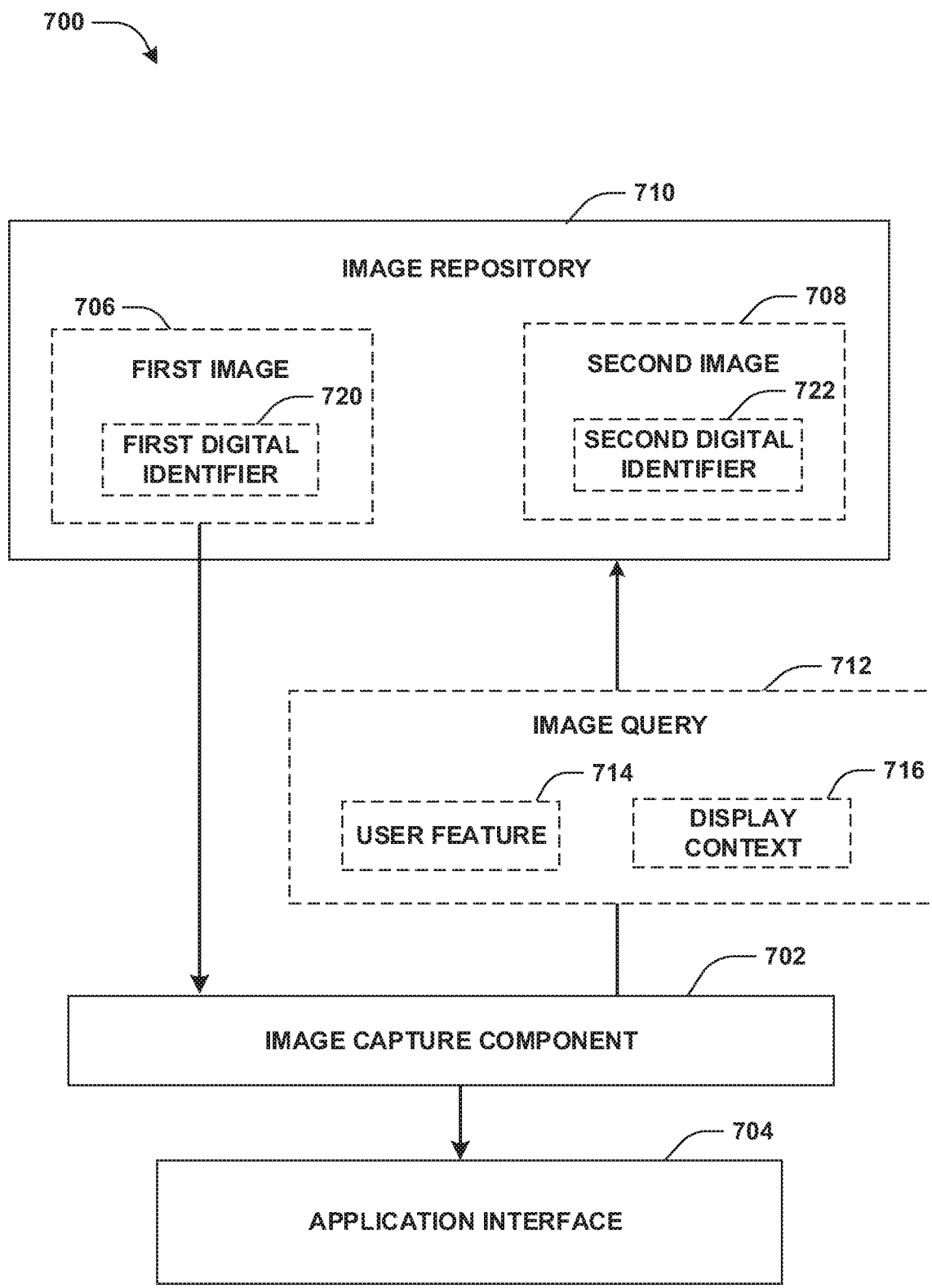
FIG. 7 is a component block diagram illustrating an example system for populating an image into an application interface, where a first image, but not a second image, is populated into the application interface.

FIG. 7 illustrates an example of a system 700, where a first image 706 but not a second image 708 is populated into an application interface 704. The system 700 may comprise an image capture component 702. The image capture component 702 may be configured to send an image query 712 to an image repository 710. The image query 712 may comprise a user feature 714 for a user viewing the application interface 704 and/or display context 716 for the application interface 704. The image capture component 702 may query the image repository 710 to identify images corresponding to the display context 716 of the application interface 704. In an example, the first image 706 and the second image 708 may be identified as corresponding to the display context 716 (e.g., a Columbus soccer stadium image and a Los Angeles soccer stadium image may correspond to soccer score display context for soccer sports application interface). For example, a first digital identifier 720 for the first image 706 and a second digital identifier 722 for a second image 708 may correspond to the display context 716. Responsive to the display context 716 corresponding to the first digital identifier 720 for the first image 706 and the second digital identifier 722 for the second image 708, the user feature 714 may be evaluated by the image capture component 702. In an example, responsive to the user feature 714 corresponding to the first digital identifier 720 for the first image 706 but not the second digital identifier 722 for the second image 708, the first image 706 may be provided to the application interface 704 for display therein (e.g., a user preference feature for the Columbus soccer team may correspond to the Columbus soccer stadium image but not the Los Angeles soccer stadium image).

Figure 8:
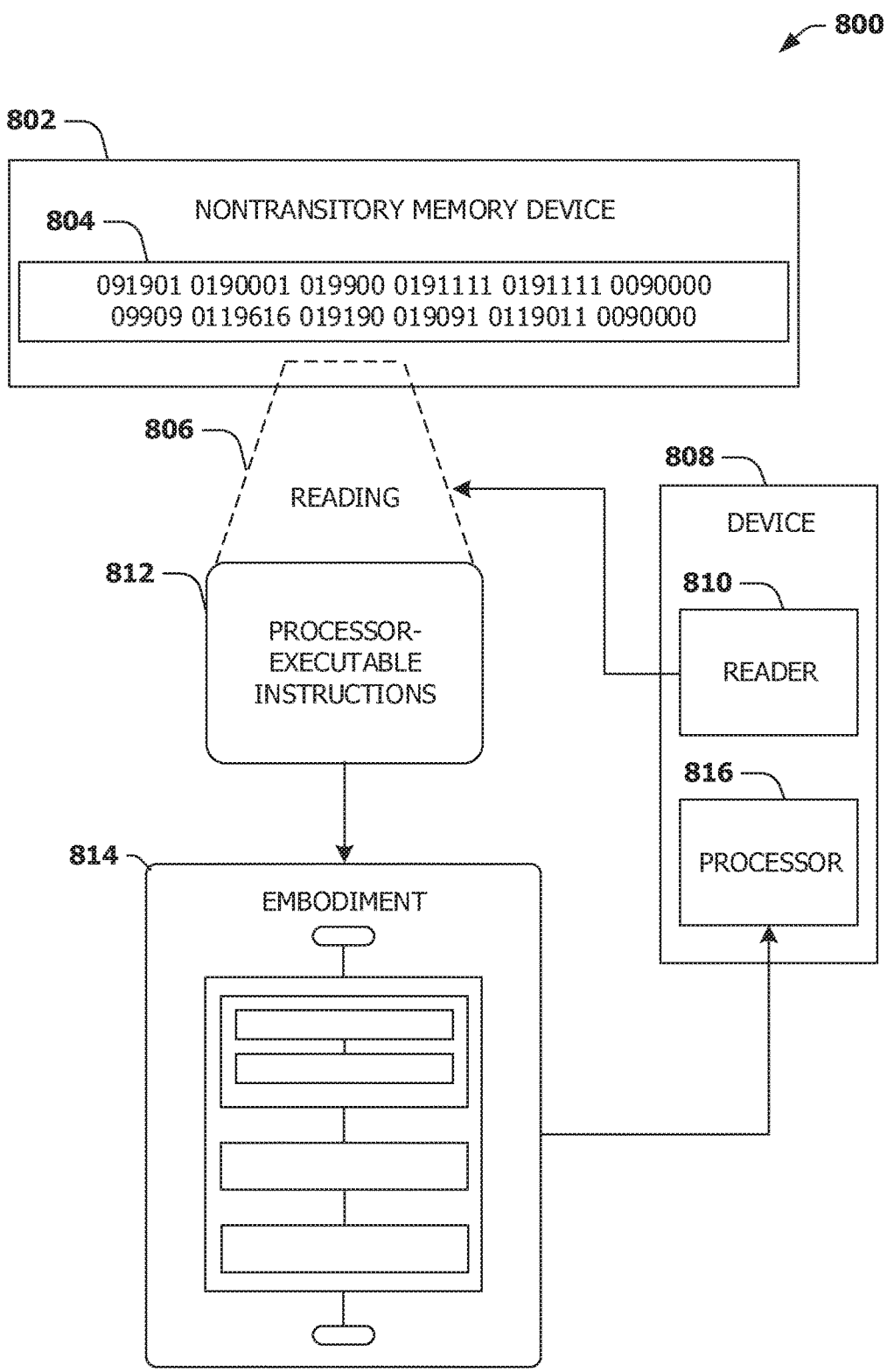
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4, for example. In some embodiments, the processor-executable instructions, when executed on the processor 816 of the device 808, are configured to implement a system, such as at least some of the example system 500 of FIGS. 5A-5C, at least some of the example system 600 of FIGS. 6A-6C, and/or at least some of example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations, and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying an application interface;
   evaluating the application interface to identify display context of the application interface based upon one or more of text recognition analysis of the application interface, image recognition analysis of the application interface or code recognition analysis of the application interface;
   evaluating, using a processor, the display context to determine if the display context is fixed or variable;
   responsive to determining, using the processor, that the display context is variable, defining dynamic display context for the display context;
   responsive to determining, using the processor, that the display context is fixed, defining fixed display context for the display context;
   displaying a camera user interface, associated with a camera of a device, to a user;
   overlaying the dynamic display context or the fixed display context over a real-time image capture preview provided by the camera user interface; and
   capturing an image through the camera user interface utilizing the camera.

2. The method of claim 1, the evaluating the application interface based upon the text recognition analysis, the text recognition analysis comprising one or more of optical character recognition analysis of the application interface, intelligent character recognition analysis of the application interface or optical mark recognition analysis of the application interface.

3. The method of claim 1, the evaluating the application interface based upon the image recognition analysis.

4. The method of claim 1, the evaluating the application interface based upon the code recognition analysis, the code recognition analysis comprising evaluating application code associated with the application interface to determine one or more of a size, a location or a function of one or more user interface elements.

5. The method of claim 1, the overlaying comprising:
   identifying a plurality of weather type icons associated with the dynamic display context; and
   rotating, in a display, between the plurality of weather type icons.

6. The method of claim 1, the overlaying comprising:
   identifying a plurality of values associated with the dynamic display context; and
   rotating, in a display, between the plurality of values.

7. The method of claim 1, the display context comprising at least one of:
a text context, an image context, an advertisement context, an interactive context, or a visual effect context.

8. The method of claim 7, the visual effect context comprising:
a fading visual effect context, a magnifying visual effect context, a brightness visual effect context, an opacity visual effect context, a weather condition visual effect context, a road condition visual effect context, or a sporting visual effect context.

9. The method of claim 1, comprising populating the image into the application interface, the populating comprising:
selecting the image from an image repository; and
utilizing the image as a background image for the application interface.

10. The method of claim 9, the selecting comprising:
identifying the image as having a digital identifier corresponding to the display context of the application interface.

11. The method of claim 1, comprising:
tagging the image with a digital identifier corresponding to at least one of the display context, the image, or the user; and
storing the image within an image repository.

12. The method of claim 1, the application interface comprising at least one of:
a weather application interface, a sports application interface, a scrapbooking application interface, or a social media application interface.

13. The method of claim 1, the application interface comprising a social media application interface and the method comprising:
providing the image to the social media application interface; and
utilizing the image within the social media application interface as a profile image or a cover photograph image.

14. The method of claim 1, comprising:
applying at least one of a filter, a camera setting adjustment, or an image setting adjustment to the real-time image capture preview; and
the capturing comprising generating the image based upon the real-time image capture preview and at least one of the filter, the camera setting adjustment, or the image setting adjustment.

15. The method of claim 1, comprising:
evaluating a second display context to determine if the second display context is fixed or variable; and
responsive to determining that the second display context is fixed, overlaying the second display context over a second real-time image capture preview provided by the camera user interface.

16. The method of claim 1, comprising:
identifying a user feature for the user;
selecting the image from an image repository based upon the user feature; and
utilizing the image as a background image for the application interface.

17. A system, comprising:
a processor; and
memory comprising processor-executable instructions that when executed by the processor cause implementation of an image capture component configured to:
identify an application interface;
evaluate the application interface to identify display context of the application interface based upon one or more of text recognition analysis of the application interface, image recognition analysis of the application interface or code recognition analysis of the application interface;
evaluate the display context to determine if the display context is fixed or variable;
responsive to determining that the display context is variable, define dynamic display context for the display context;
display a camera user interface, associated with a camera of a device, to a user;
overlay the dynamic display context over an image capture preview provided by the camera user interface; and
capture an image through the camera user interface utilizing the camera.

18. The system of claim 17, the image capture component configured to:
populate the image into the application interface;
responsive to detecting a change from the dynamic display context to a second display context, query an image repository to identify a second image having a digital identifier corresponding to the second display context; and
populate the second image into the application interface.

19. A non-transitory computer readable medium comprising instructions which when executed perform a method, comprising:
identifying an application interface;
evaluating the application interface to identify display context of the application interface based upon one or more of text recognition analysis of the application interface, image recognition analysis of the application interface or code recognition analysis of the application interface;
evaluating, using a processor, the display context to determine if the display context is fixed or variable;
responsive to determining, using the processor, that the display context is fixed, defining fixed display context for the display context;
displaying a camera user interface, associated with a camera of a device, to a user;
overlaying the fixed display context over an image capture preview provided by the camera user interface; and
capturing an image through the camera user interface utilizing the camera.

20. The computer readable medium of claim 19, comprising:
tagging the image with a digital identifier corresponding to at least one of the display context, the image, or the user; and
storing the image within an image repository.

* * * * *